United States Patent [19]

Sarhangi et al.

[11] Patent Number: 4,610,708
[45] Date of Patent: Sep. 9, 1986

[54] METHOD FOR MAKING METAL HALIDE OPTICAL FIBER

[75] Inventors: Ahmad Sarhangi, Painted Post; George W. Scherer, Big Flats, both of N.Y.

[73] Assignee: Corning Glass Works, Corning, N.Y.

[21] Appl. No.: 747,769

[22] Filed: Jun. 24, 1985

[51] Int. Cl.⁴ ........................................... C03B 37/027
[52] U.S. Cl. ...................................... 65/3.12; 65/3.15; 65/32; 65/DIG. 16
[58] Field of Search ................. 65/2, 3.11, 3.12, 3.15, 65/32, DIG. 15, DIG. 16; 350/96.34

[56] References Cited

U.S. PATENT DOCUMENTS

| | | | |
|---|---|---|---|
| 4,378,987 | 4/1983 | Miller et al. | 65/3.12 |
| 4,415,404 | 11/1983 | Riegl | 65/DIG. 16 |
| 4,493,721 | 1/1985 | Auwerda et al. | 65/3.12 |
| 4,560,667 | 12/1985 | Lucas et al. | 65/2 X |

FOREIGN PATENT DOCUMENTS

| | | | |
|---|---|---|---|
| 56-101105 | 8/1981 | Japan | 65/3.11 |
| 59-137329 | 8/1984 | Japan | 65/DIG. 16 |

Primary Examiner—Robert Lindsay
Attorney, Agent, or Firm—K. van der Sterre

[57] ABSTRACT

In the manufacture of preforms for metal halide optical fibers by the vapor deposition of metal halide layers on the inside surface of a silicate glass substrate tube, silicon release from the tube side wall by fluorine-containing reactants used in the vapor deposition process is reduced by the preliminary application of a slurry coating of a sinterable, fluorine-resistant metal halide or other glass composition which is dried and sintered to a passivation layer.

7 Claims, 1 Drawing Figure

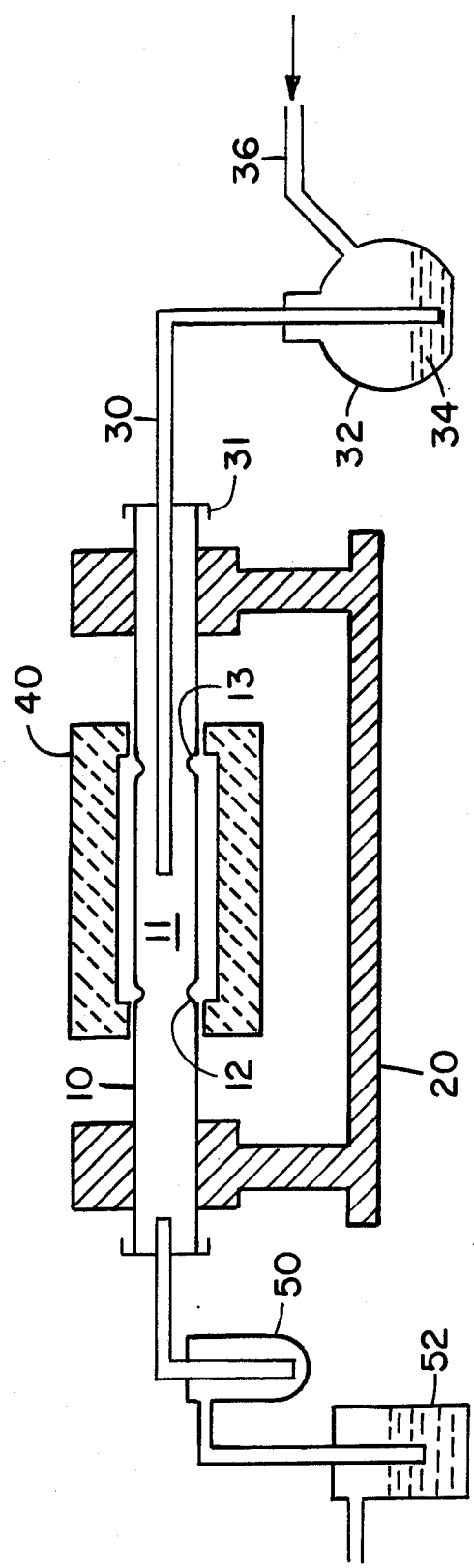

METHOD FOR MAKING METAL HALIDE OPTICAL FIBER

The present invention relates to methods for making glass optical waveguide fibers, and particularly to an improvement in vapor deposition methods for making optical fibers comprising metal halide core and cladding elements.

Commercial optical waveguides are presently formed of oxide glass materials, typically fused silica and doped fused silica glasses. Improvements in such materials have continued to the point where loss coefficients near the theoretical minimum of 0.1 db/km at 1.6 microns have been achieved. However, it has been recognized that even lower attenuations, perhaps as low as 0.001 db/km, might be attainable in halide glass systems which can operate at wavelengths further into the infrared region. Among the halide glasses that have been considered for the manufacture of extremely low loss optical waveguide fibers are glasses based on $BeF_2$, $ZrF_4$ and $ZnCl_2$.

While it has been proposed, for example in U.S. Pat. Nos. 4,189,208, 4,308,066, and 4,343,638, to prepare metal halide glasses for optical fibers by ordinary melting techniques, some workers have suggested instead the use of chemical vapor deposition to provide the high purity metal halides which will be needed. Thus U.S. Pat. No. 4,378,987 and published Japanese Patent Application No. 57-051146 describe the preparation of pure metal halide products by vapor phase reactions between metal- and halogen-containing source compounds. Among the halogen-containing reactants that are used in such reactions, however, are agents such as HF and ammonium fluoride that are very corrosive and difficult to handle.

Alternative approaches to the fabrication of metal halide fibers are disclosed in copending commonly assigned patent application Ser. No. 06/544,129 filed Oct. 21, 1983. That application describes the vapor deposition of metal halide glass constituents, also utilizing organometallic compounds as metal source materials, but wherein the use of corrosive agents such as HF to provide the necessary halogen content of the glass is avoided.

In the above-described vapor deposition methods, and potentially in other vapor deposition approaches utilizing organometallic compounds as metal source materials, there is a potential for carbon contamination of the metal halide deposit. In copending commonly assigned patent application Ser. No. 06/544,130, filed Oct. 21, 1983, techniques for avoiding or removing this carbon contamination are disclosed. Like the vapor deposition approaches previously described, however, those carbon removal techniques may require the use of small quantities of corrosive fluorides.

Thus much of the previously developed technology for depositing metal halides by chemical vapor deposition reactions carries with it a need to employ fluorine-containing compounds at some stage in the process. This can present a problem when it is desired, as in U.S. Pat. No. 4,378,987, to deposit metal halide core and cladding layers inside a glass substrate tube. The preferred material for the substrate tube is silicate glass, and fluorine-containing compounds are capable of attacking or etching such glasses and releasing silicon compounds which can thereafter contaminate the metal halide cladding and core glasses. Such contamination is undesirable because of the infrared optical absorption caused by the presence of silicon compounds in the halide fiber core and cladding layers.

U.S. Pat. No. 4,114,980 discloses that, in the manufacture of silica glass optical fibers, the vapor deposition of a initial silica barrier layer is helpful to prevent contamination of the core and cladding layers by OH groups from the substrate tube. Such an approach cannot be used in the fabrication of metal halide fibers, however, since the barrier layer deposition process itself would promote the release of contaminating silicon compounds from the tube wall.

It is therefore a principal object of the present invention to provide a method for making a metal halide optical fiber utilizing a vapor deposition approach, but wherein silicon contamination of the metal halide cladding and core elements of the optical fiber is avoided.

It is a further object of the invention to provide an improvement in the method for making an optical fiber by vapor-depositing metal halide cladding and core glass constituents inside a silicate glass substrate tube, wherein silicon levels in the cladding and core glasses are reduced.

It is a further object of the invention to provide a method for protecting a silicate glass substrate tube from etching attack by fluorine-containing vapors utilized in connection with chemical vapor deposition reactions conducted inside the tube.

Other objects and advantages of the invention will become apparent from the following description.

SUMMARY OF THE INVENTION

The present invention provides an improved method for making an optical fiber comprising a metal halide core and metal halide cladding within a silicate glass jacket. The improvement is useful in essentially any fabrication process for such fiber wherein layers of metal halide glass or glass-forming constituents are deposited from the vapor phase on the inside surface of a silicate glass substrate tube, and wherein the halide deposition process requires the use of one or more fluorine-containing vapors capable of etching the silicate glass forming the inside wall of the substrate tube.

Briefly the method of the invention comprises the steps, prior to the vapor deposition of any metal halides in the tube, of first providing a slurry coating of a sinterable, particulate, fluoride-resistant material on the inside surface of the tube. The slurry is a flowable mixture consisting essentially of an organic vehicle and a sinterable particulate material such as a sinterable metal halide composition dispersed in the vehicle, the metal halide being inert to fluorine-containing vapors such as HF and fluorine under the conditions which are to be used in the subsequent vapor deposition process.

After the slurry coating has been deposited, the organic vehicle is removed by drying and the particulate material is sintered by heating to fuse it into an integral protective coating bonded to the inside surface of the silicate glass tube. This protective coating, hereinafter sometimes referred to as a passivation layer, acts to retard or eliminate attack on the tube wall by fluorine-containing vapors.

In practicing the above method, the organic vehicle selected should be one which is both completely vaporizable and also inert to the sinterable material selected for forming the passivation layer. The sinterable particulate material selected should be one that can be fused to an integral layer at a temperature below the softening temperature of the glass tube and, as a fused coating, exhibits an expansion coefficient sufficiently closely matched to the expansion coefficient of the tube that, at the coating thickness employed, the coated tube can be subsequently processed without spalling or unacceptable checking of the coating.

DESCRIPTION OF THE DRAWING

The invention may be further understood by reference to the drawing, which schematically illustrates apparatus suitable for practicing the method of the invention as herein described.

DETAILED DESCRIPTION

Silicate glass tubes are attractive substrates for optical fiber manufacture by the vapor deposition of metal halide optical glasses because such tubes are commercially available, relatively inexpensive, and chemically durable. The latter feature is of particular importance because many of the known metal halide glasses which are potential candidates for use in metal halide optical fibers are non-durable, particularly against attack by moisture. Thus a chemically durable jacketing material will be needed to permit the use of such fibers even in relatively dry environments.

The most significant disadvantage of silicate glasses are jacketing materials for metal halide optical fibers is non-durability toward fluorine-containing vapors, e.g., $F_2$ gas, HF vapors, and the vapors of other fluorine compounds that release free fluorine or fluorine radicals under the conditions of chemical vapor deposition reactions. These vapors attack or etch silicate glasses, causing the release of silicon from the jacket material. It is this disadvantage that the present invention overcomes.

As already noted, fluorine-containing vapors can be used for a number of purposes in the vapor deposition of metal halide glasses or glass-forming compounds inside a glass reaction tube. For example, such vapors can be present in large quantities where the deposition product is to be a metal fluoride and a fluorine-containing gas is needed as the fluoride source for the product. In some of these processes, fluorine or fluoride gases may also be present as a byproduct of the reaction. Examples of reactions utilizing fluorine-containing source compounds are illustrated in Table I below:

TABLE I $3BeB_2H_8 + 2BF_3 \rightarrow 3BeF_2 + 4B_2H_6$ $3Be(CH_3)_2 + 2BF_3 \rightarrow 3BeF_2 + 2B(CH_3)_3$ $2AlB_3H_{12} + 6HF \rightarrow 2AlF_3 + 3B_2H_6 + 6H_2$ $Al(CH_3)_3 + BF_3 \rightarrow AlF_3B(CH_3)_3$ As is evident from Table I, substantial quantities of fluorine-containing vapors may be used in many potentially useful halide deposition reactions.

In other deposition reactions, the deposited product can be a metal chloride or other halide instead of a metal fluoride; yet fluoride gases may still be present in the deposition zone. Thus fluorine-containing gases such as $F_2$ and $NF_3$ can be used to remove or avoid deposition of pyrolytic carbon in such deposits. Alternatively, fluoride vapors can be used to remove impurities such as oxygen and/or hydroxyl groups or water from the metal halide deposit.

In each of the above processes, fluorine-containing vapors are introduced into the reaction zone at some point during the deposition of the metal halide core and cladding layers. Thus there is the potential for releasing silicon-containing impurities into these layers if the silicate glass of the substrate tube wall remains unprotected from those vapors.

In providing a protective passivation layer to present silicon release during vapor deposition, the sinterable particulate material selected to form the layer must be inert to fluorine and fluorine-containing vapors under the reaction conditions employed for the subsequent vapor deposition reaction. Preferably, the material will be a sinterable, glass-forming metal halide composition. In principle, any of the known halide glass-forming compositions that are capable of being sintered to a fluoride-impervious layer at a sintering temperature below the softening temperature of the silicate glass substrate tube, could be selected.

The vapor deposition of metal fluoride compositions may involve vapor reactions at elevated temperatures, e.g. at 400°–500° C., or plasma-induced reactions at room temperature but in the presence of free fluorine radicals. Metal fluoride glasses are generally non-reactive with fluorine under these conditions and are therefore particularly preferred.

Alternative materials for use in forming the passivation layer, particularly under milder reaction conditions, include other fluorine-resistant glasses such as the fluorine-resistant phosphate glasses. A phosphate glass containing about 72% $P_2O_5$, 18% $Al_2O_3$, and 10% ZnO is known to be resistant to HF and could be used.

In general, the simplest halide glass-forming composition which is physically and thermally compatible with the metal halide core and cladding glasses to be deposited over the passivation layer will be preferred. More complex halide glasses, containing four, five or even more glass-forming constituents, can be used; however these are typically more expensive to provide in a pure and truly homogeneous form and are generally no more effective as a barrier against fluorine attack than simple halide glasses.

$BeF_2$ is a particularly preferred material for the passivation layer because it is readily sintered to a stable, clear glass at temperatures below the softening temperatures of several types of commercially available glass tubing. Where $BeF_2$ is unsuitable, other compositions, based on halides such as $PbF_2$, $AlF_3$ or the like, could be employed. Table I below reports a number of compositions selected from among the known halide glasses which could be used to form a passivation layer in accordance with the invention. These compositions, which are reported in mole percent, are of course only representative of the compositions which could be used.

TABLE II

| Composition No. | |
|---|---|
| 1 | 100% $BeF_2$ |
| 2 | 50% $PbF_2$—50% $AlF_3$ |
| 3 | 27% $CdF_2$—31.5% $PbF_2$—31.5% $AlF_3$—10% LiF |
| 4 | 40% $AlF_3$—22% $BaF_2$—22% $CaF_2$—16% $YF_3$ |
| 5 | 63% $ZrF_4$—33% $BaF_2$—4% $GdF_3$ |
| 6 | 58% $HfF_4$—33% $BaF_2$—9% $LaF_3$ |
| 7 | 40% $ZnF_2$—20% $ThF_4$—20% $AlF_3$—20% $CaF_2$ |

In general, multicomponent halide glasses such as illustrated in the above Table tend to be less stable than $BeF_2$, such that devitrification of the passivation layer following sintering is possible. However, this does not rule out use of the composition unless crystallization in the layer progresses to the point where the layer becomes permeable to fluorine-containing vapors, or unless the resulting crystal phases prove harmful to the physical or optical characteristics of the optical fiber and persist after the tubular preform has been collapsed and drawn into optical fiber.

The source of the particulate metal halide material used to form the metal halide slurry is not critical provided the purity of the metal halide is sufficient that excess attenuation of the optical signal by the passivation layer will not occur. In some cases, commercially available metal halide powders are sufficiently pure that they can be directly incorporated into the slurry for application to the substrate tube. Alternatively, metal halide powders of very high purity can be formed by metal halide vapor deposition reactions such as described in U.S. Pat. No. 4,378,987 or JA No. 57-051146. These powders can then be collected and dispersed in an appropriate vehicle for application to the substrate tube wall. Still other suitable metal halides may be produced by known solution methods.

Preferred vehicles for formation of the metal halide slurry are dry, volatile organic liquids. Dry liquids, i.e., liquids free of water, are preferred in order to minimize water contamination of the slurry and its constituents, the hydroxyl ion being an undesirable, infrared-absorbing impurity in halide glasses. Examples of suitable vehicles are acetone, chloroform, methylene chloride, alcohols, hexane, and other alkanes.

The solids content of the metal halide slurry is not critical and may be optimized by routine experiment. The preferred practice is to use the maximum solids content consistent with the degree of flowability needed for the slurry coating technique to be used. The slurry may be applied by dipping, spraying or any other conventional method. The approach taken depends mainly on the geometry of the substrate tube, the accessibility of the surface to be coated, and the thickness desired in the sintered passivation layer.

One type of apparatus suitable for applying a passivation layer is schematically illustrated in the drawing, which is a schematic elevational view in cross-section illustrating the processing of a substrate tube in accordance with the invention.

Referring to the drawing, a glass substrate tube 10 is positioned for rotation in a glass-working lathe 20 and is rotated while a metal fluoride slurry is delivered into the tube via slurry delivery tube 30. The substrate tube 10 passes through an electrically heatable furnace 40 which has a heating capability sufficient to sinter a metal halide deposit situated on the inside wall of the tube to an integral layer.

The glass substrate tube 10 includes annular constrictions 12 and 13 which define a deposition zone 11 within tube 10 wherein a passivation layer is to be provided. Slurry delivery tube 30, which passes into the tube via rotary seal 31 and terminates in the deposition zone, originates from flask 32 which contains a quantity of a flowable metal halide slurry 34. Gas pressure lines 36 leading into flask 32 provides a means for pressurizing flask 34, thereby forcing slurry 34 through the delivery tube 30 and into deposition zone 11. Effluent from the coating, drying, and sintering steps of the passivation layer deposition process is processed through trap 50 and oil bubbler 52 to remove objectionable by-products of the process.

The thickness of the passivation layer required for protection of a silicate glass substrate tube is minimal in the case where complete sintering to a hermetic glass film can be achieved. Typical thicknesses for a relatively stable glass forming compositions such as $BeF_2$ may range from 0.01–1.0 mm. Somewhat thicker layers may be utilized where incomplete sintering, high glass viscosity and/or devitrification are to be taken into account.

The invention may be further understood from the following illustrative Example, with reference to the Drawing.

EXAMPLE

A glass tube 10 approximately 50 cm in length, outside diameter 19 mm and inside diameter 16 mm, is selected for use as a substrate tube for fabricating a metal halide optical fiber. The tube selected is a commercially available alkali borosilicate glass tube (Corning Code 7052 glass tubing, Corning Glass Works, Corning, N.Y. 14831), having a coefficient of thermal expansion (average, 0°–300° C.) of approximately $46 \times 10^{-7}/°C.$, and a softening temperature of approximately 712° C. The glass tube is provided with two annular constrictions, 12 and 13, defining opposing ends of a reaction zone 11 approximately 25 cm in length within the tube which is to be provided with a passivation layer covering the tube wall.

The tube is horizontally mounted for rotation in a glass working lathe 20 and a slurry feed line 30 is inserted into one end of the tube and into reaction zone 11 through a rotating seal 31 on the end of the tube. The slurry feed line 30 extends from the tube to a flask 32 containing a quantity of a slurry 34 consisting of pure $BeF_2$ powder (approximately 10 g) suspended in an acetone vehicle (approximately 20 ml). In its mounted position, the tube extends through the hot zone of an electrically heatable furnace 40 which surrounds the reaction zone.

To coat the reaction zone, dry argon is supplied to flask 32 through pressurizing line 36, forcing the slurry through the feed line and into the tube. The tube is rotated as the slurry is supplied so that a uniform coating of slurry is obtained in the reaction zone. After the supply of slurry has been delivered, the flow of argon is continued until all of the acetone vehicle in the tube has been evaporated, leaving a dry, uniform $BeF_2$ deposit.

The furnace 40 is next heated to approximately 550° C. to sinter the $BeF_2$ deposit into a non-porous glassy layer. During the heating process, helium gas is introduced into the reaction zone, the presence of this gas during sintering helping to avoid bubble entrapment in the consolidated film. Consolidation of the deposit to a non-porous $BeF_2$ glass film occurs within a few minutes at 550° C. The final thickness of the $BeF_2$ glass film is about 10 microns; the thermal expansion of the $BeF_2$ glass is approximately $67 \times 10^{-7}/°C.$ The coated tube produced as described is resistant, over its coated portions, to attack from any of the fluorine-containing gases being utilized for use in the vapor deposition of metal halide compounds. In an example of a typical fiber manufacturing process, the tube would be utilized as a substrate for vapor depositing a $BeF_2$ glass optical cladding layer. In that process, $Be(CH_3)_2$ and $BF_3$ would be fed into the reaction zone and reacted to form a highly pure $BeF_2$ deposit as follows:

$$3Be(CH_3)_2 + 2BF_3 \rightarrow 3BeF_2 + 2B(CH_3)_3$$

with greatly reduced risk of attack on the substrate tube wall by $BF_3$ or its fluorine-containing reaction intermediates or by-products. Good resistance to tube sidewall attack would also be expected when substituting the more corrosive HF for $BF_3$ as the fluorinating reagent in the above reaction. A suitable metal halide core layer, composed, for example, of $BeF_2+AlF_3$, would then be deposited on the $BeF_2$ cladding layer, and the tube, glass film, and metal halide core and cladding layers would then be collapsed into a rod and drawn into a metal halide optical fiber with a silicate glass jacket.

In an alternative deposition approach, utilizing an organometallic beryllium source compound in a decomposition type reaction wherein pyrolytic carbon is codeposited with beryllium fluoride, fluorine-containing gases such as $F_2$ or $NF_3$ would be used to volatile the carbon from the depositing $BeF_2$. Here again, the presence of the $BeF_2$ glass passivation layer would provide an effective barrier against attack on the silicate glass of the substrate tube by the $F_2$ or $NF_3$ treating atmosphere.

As will be evident from the foregoing description, the present invention is not limited to the use of passivation layers composed of the particular halide glass compositions hereinabove described, but rather comprises the use of any halide or other glass capable of forming an integral fluorine-resistant layer on a silicate glass tube. It will also be appreciated that, using sufficiently pure halide starting materials, the slurry deposition technique could be extended to the production of thick cladding layers or even of core layers of metal halide glass on the inside surfaces of silicate glass substrate tubes. Still other adaptations and modifications of the principles and procedures hereinabove described will be apparent to those skilled in the art from the foregoing description and may be practical within the scope of the appended claims.

We claim:

1. In a method for making an optical fiber preform which comprises the vapor deposition of layers of metal halide glass or glass-forming constituents on the inside surface of a silicate glass substrate tube in the presence of a fluorine-containing reactant capable of attacking and releasing silicon compounds from the inside surface of the substrate tube, the improvement comprising, prior to vapor deposition, (a) providing a slurry coating of a sinterable, particulate, fluoride-resistant material on the inside surface of the tube, the slurry consisting essentially of the sinterable, particulate material and a volatilizable organic vehicle for the material;
    (b) removing the volatilizable organic vehicle to leave a dry deposit of the particulate sinterable material; and
    (c) heating the deposit to sinter the particulate material into a fluoride-resistant protective coating fused to the inside surface of the tube,
    whereby the fused protective coating acts as a passivation layer to retard the release of silicon compounds from the inside surface of the tube.

2. The method of claim 1 wherein the sinterable, particulate material is a particulate metal halide composition.

3. The method of claim 2 wherein the particulate metal halide composition is a composition which can be sintered to a metal fluoride glass.

4. The method of claim 3 wherein the particulate metal halide composition consists essentially of a $BeF_2$ glass.

5. A method for making a metal halide optical fiber which comprises the steps of:
    (a) selecting a glass tube composed of a silicate glass exhibiting surface etching in the presence of HF;
    (b) coating the inside wall of the glass tube with a flowable slurry, the flowable slurry consisting essentially of a liquid vehicle and a particulate solid, the particulates solid consisting essentially of a sinterable composition for a fluorine-resistant glass;
    (c) heating the coated tube to evaporate the liquid vehicle and sinter the particulate solid to a non-porous glass film;
    (d) vapor-depositing a first metal halide layer on the glass film to form a metal halide cladding layer;
    (e) vapor depositing a second metal halide layer on the first metal halide layer to form a metal halide core layer; and
    (f) collapsing and drawing the tube, film, and metal halide layers into a metal halide optical fiber.

6. The method of claim 5 wherein the glass film consists essentially of a metal fluoride glass.

7. The method of claim 6 wherein the glass film consists essentially of $BeF_2$.

* * * * *